(12) United States Patent
Stappers et al.

(10) Patent No.: US 8,524,795 B2
(45) Date of Patent: Sep. 3, 2013

(54) RADIATION CURABLE INK COMPOSITION

(75) Inventors: Franciscus H. M. Stappers, Broekhuizen (NL); Peter M. A. Wetjens, Sevenum (NL); Hendrik J. A. Ogrinc, Velden (NL); Gerardus C. P. Vercoulen, Velden (NL)

(73) Assignee: Oce-Technologies B.V., Venlo (NL)

( * ) Notice: Subject to any disclaimer, the term of this patent is extended or adjusted under 35 U.S.C. 154(b) by 50 days.

(21) Appl. No.: 13/465,447

(22) Filed: May 7, 2012

(65) Prior Publication Data

US 2012/0264845 A1 Oct. 18, 2012

Related U.S. Application Data

(63) Continuation of application No. PCT/EP2010/067685, filed on Nov. 17, 2010.

(60) Provisional application No. 61/262,452, filed on Nov. 18, 2009, provisional application No. 61/289,305, filed on Dec. 22, 2009.

(30) Foreign Application Priority Data

Feb. 11, 2010 (EP) .................................... 10153255

(51) Int. Cl.
*C08F 2/50* (2006.01)
*C09D 11/10* (2006.01)
*C09D 11/00* (2006.01)
*C09D 4/06* (2006.01)

(52) U.S. Cl.
USPC ............. 522/182; 522/74; 522/81; 522/83; 522/75; 522/153; 522/178; 522/909; 522/181; 523/160; 523/161; 106/31.13; 106/31.27; 106/31.28; 106/31.6

(58) Field of Classification Search
USPC ............ 522/74, 81, 83, 75, 182, 153, 178, 522/909, 181; 523/160, 161; 106/31.13, 106/31.27, 31.28, 31.6
See application file for complete search history.

(56) References Cited

U.S. PATENT DOCUMENTS

| | | | | |
|---|---|---|---|---|
| 6,593,390 | B1 * | 7/2003 | Johnson et al. | 522/74 |
| 7,763,668 | B2 * | 7/2010 | Trueba et al. | 522/76 |
| 7,932,300 | B2 * | 4/2011 | Naruse et al. | 522/8 |
| 8,002,884 | B2 * | 8/2011 | Grant et al. | 106/31.13 |
| 8,378,005 | B2 * | 2/2013 | Yoshihiro et al. | 523/160 |
| 2009/0053484 | A1 * | 2/2009 | Yoshihiro et al. | 428/195.1 |
| 2009/0087627 | A1 * | 4/2009 | Watanabe et al. | 428/195.1 |
| 2009/0124720 | A1 | 5/2009 | Tsuchiya et al. | |
| 2009/0176072 | A1 * | 7/2009 | Ward et al. | 428/195.1 |
| 2009/0244116 | A1 * | 10/2009 | Ohnishi | 347/6 |
| 2009/0305005 | A1 * | 12/2009 | Ward et al. | 428/195.1 |

FOREIGN PATENT DOCUMENTS

| EP | 1 967 556 A1 | 9/2008 |
|---|---|---|
| EP | 1 988 131 A1 | 11/2008 |
| WO | WO 02/38687 A1 | 5/2002 |

* cited by examiner

*Primary Examiner* — Sanza McClendon
(74) *Attorney, Agent, or Firm* — Birch, Stewart, Kolasch & Birch, LLP

(57) ABSTRACT

A radiation curable ink composition has improved adhesion towards rigid recording media, good jetting behavior and no or minimal health and safety risks. The radiation curable ink has a viscosity of 30 mPa·s, or less, at 50° C., has at least two monofunctional monomers, the two monofunctional monomers including a first monomer selected from an N-vinyl amide and a second monofunctional monomer being isobornyl acrylate, a difunctional acrylate monomer being propoxylated (or ethoxylated) neopentyl glycol di acrylate (SR 9003), at least one multifunctional monomer selected from the group consisting of a trifunctional acrylate monomer, a tetrafunctional acrylate monomer, a pentafunctional acrylate monomer, a trifunctional epoxide monomer, a tetrafunctional epoxide monomer, a pentafunctional epoxide monomer, a trifunctional oxetane monomer, a tetrafunctional oxetane monomer, a pentafunctional oxetane monomer, a trifunctional vinylether monomer, a tetrafunctional vinylether monomer and a pentafunctional vinylether monomer, the ink further includes at least one photoinitiator and a colorant.

18 Claims, No Drawings

RADIATION CURABLE INK COMPOSITION

CROSS-REFERENCE TO RELATED APPLICATIONS

This application is a Continuation of PCT International Application No. PCT/EP2010/067685 filed on Nov. 17, 2010, which claims priority under 35 U.S.C. 119(e) to U.S. Provisional Application Nos. 61/262,452 filed in Nov. 18, 2009 and 61/289,305 filed in Dec. 22, 2009, and under 35 U.S.C. 119(a) to Patent Application No. 10153255.4 filed in Europe on Feb. 11, 2010, all which are hereby expressly incorporated by reference into the present application.

FIELD OF THE INVENTION

The invention relates to a radiation curable ink composition for inkjet printing application and in particular for application on rigid recording media.

BACKGROUND OF THE INVENTION

Radiation curable ink compositions are generally known in the art. An ultraviolet radiation ink composition comprises at least one radiation curable component and may comprise a photo initiator, a colorant and an inhibitor. Inkjet printing devices of radiation curable inks usually require a low viscosity ink. In inkjet printing, ink drops may be formed on demand by an inkjet printhead. To ensure proper formation of ink drops the viscosity of the ink in use may be required to be no more than 100 mPa·s and commonly no more than 30 mPa·s. Typically, when the ink is ejected from the printhead, the ink has a viscosity of less than 20 mPa·s, e.g. 8-12 mPa·s at an operating temperature of the printhead.

Many inkjet printheads nowadays are heated to an elevated temperature in order to reduce the ink viscosity to a desired level. The operation temperature of the printhead is however restricted due to on one side the design and material choice of the printhead and on the other side the thermal stability of the radiation curable ink composition. Generally, in the prior art, inkjet printheads for radiation curable inks are operated around 45-55° C.

Ink components, especially the curable component and/or the photoinitiator, are selected in order to provide proper curing properties. The curing speed and curing quality depends furthermore on the ultraviolet radiation means used in the application. In curing quality a distinction may be made between outer surface curing level and inner curing level of the ink layer on top of the recording medium. The adhesion of the ink layer to the recording medium may also be effected by the curing quality.

In the application of ink on rigid recording media, the adhesion of the ink layer onto the recording medium is known to be an important property. Certain rigid recording media are relatively critical towards adhesion of radiation curable inks. For instance recording media having relatively apolar surface properties, such as polystyrene, tend to show less adhesion towards radiation curable inks. An important aspect of radiation curable ink components is their reactivity under curing conditions. A known drawback of many of these reactive components is their health and safety risks; for example reactive components may have (skin) irritancy properties and/or provide sensibilisation effects on the longer term. Health and safety risks of (uncured) inks are indicated by standardised labels.

The health and safety risks depend inter alia on the specific components selected, the amount of component used in the ink and the combination with other components in the ink composition. In order to reduce the health and safety risks the ink during application is cured. In general, after curing, the ink composition in image applications looses at least a part of the health and safety risks, in particular the risks which are related with the radiation curable nature of the ink composition, thereby limiting the health and safety risks of the resulting print. However, prior art uncured inks are known to exhibit such safety and health risks when not cured, while such uncured inks may be handled by unsuspecting users, e.g. for supplying ink to a printing device.

SUMMARY OF THE INVENTION

It is an object of the present invention to provide a radiation curable ink composition for inkjet printing, which ink composition provides improved adhesion towards rigid recording media, maintains proper flexibility needed for application on flexible recording media, provides no, or at least minimal, health and safety risks and provides good jetting behaviour in a prior art inkjet printhead.

According to the invention, this object is achieved by a radiation curable ink having a viscosity of 30 mPa·s, or less, at 50° C., the ink comprising at least two monofunctional monomers, the at least two monofunctional monomers comprising a first monomer selected from an N-vinyl amide and a second monofunctional monomer being isobornyl acrylate, a difunctional acrylate monomer being propoxylated (or ethoxylated) neopentyl glycol di acrylate, for example SR 9003, at least one multifunctional monomer selected from the group consisting of a trifunctional acrylate monomer, a tetrafunctional acrylate monomer, a pentafunctional acrylate monomer, a trifunctional epoxide monomer, a tetrafunctional epoxide monomer, a pentafunctional epoxide monomer, a trifunctional oxetane monomer, a tetrafunctional oxetane monomer, a pentafunctional oxetane monomer, a trifunctional vinylether monomer, a tetrafunctional vinylether monomer and a pentafunctional vinylether monomer, the ink further comprising at least one photoinitiator and a colorant.

N-vinyl amides are known monomers in the art. N-vinyl amides have a vinyl group attached to the nitrogen atom of an amide. The amide may be further substituted The n-vinyl amide is preferably N-vinyl caprolactam (NVC).

The monomer N-vinyl caprolactam provides fast curing and low viscosity, improves adhesion range onto rigid receiving media and is a relatively safe monomer for use in radiation curable ink.

The amount of N-vinyl caprolactam added to the ink composition is from 15 to 25 wt %, preferably less than 20 wt %. If added to an ink composition at amount of less than 20 wt %, based on the total amount of the ink weight, no labeling may be required for such an embodiment of the ink (depending on the other ingredients of the ink composition), indicating that the ink is safe with respect to health.

The isobornyl acrylate (IBOA) is selected from the group of cyclic monofunctional monomers. Isobornyl acrylate provides good adhesion onto rigid receiving media. The use of cyclic monofunctional monomers in inks is generally known. The group of cyclic monofunctional monomers also comprises phenoxyethyl acrylate, tetrahydrofufuryl acrylate and cyclic TMP formal acrylate.

It has further been found that isobornyl acrylate provides improved jetting behaviour in an inkjet printhead. The recovery time of a nozzle of a printhead, the printhead which has not been jetting ink drops for a certain periode while the printhead and ink is maintained at operation temperature, is improved by using isobornyl acrylate in the ink composition.

The advantage is that the temperature of the printheads in the inkjet printer may be maintained at operation temperature between successive print operations for a longer period of time without the need of maintenance operation before starting a next print job. Also the start up time of the inkjet printer may be considerably reduced compared to a printer, in which the printheads need to be cooled down shortly after finishing a print job.

Furthermore it has been found that isobornyl acrylate in the ink, when used in inkjet printing application, provides a reduced scent compared to alternative monofunctional monomers. Such a scent of the known alternative monofunctional monomers may be experienced by users during an operation of the printhead and is known to be deemed—at least by the users—unhealthy and is already for that reason undesirable. The amount of isobornyl acrylate is from 15 wt % to 25 wt %, preferably less than 20 wt %, based on the total weight of the ink.

Furthermore it is found that an ink comprising a combination of the first monofunctional monomer, which is preferably n-vinyl caprolactam, and the second monofunctional monomer (isobornyl acrylate) provides an improved curing speed compared to an ink comprising only one of the two monofunctional monomers (in a similar amount to the total amount of the two monofunctional monomers. Thus the selection of the combination of the first monofunctional monomer and the second monofunctional monomer of the present invention provides advantages in curing behaviour of the ink while maintaining a higher level of monofunctional monomers.

The ink may comprise additional monofunctional monomers besides the two monofunctional monomers selected in the invention. The total amount of the monofunctional monomers in the ink may be from 30 wt % to 60 wt %, preferably from 30 wt % to 50 wt %, based on the total weight of the ink.

The ratio between monofunctional monomers and multifunctional monomers provides a balance between curing speed of the ink and flexibility of the cured ink layer. A higher flexibility of the cured ink layer is beneficial for adhesion towards flexible recording media.

The difunctional acrylate monomer is propoxylated neopentyl glycol di acrylate, for example SR 9003. Alternatively, ethoxylated neopentyl glycol di acrylate may be used as the difunctional acrylate monomer. The advantage of the selected difunctional acrylate monomer is the relatively safe use of the difunctional monomer. If added to an ink composition no labeling may be required for such an embodiment of the ink (depending on the other ingredients of the ink composition), indicating that the ink is safe with respect to health.

The amount of difunctional acrylate monomer is from 15 wt % to 60 wt %, preferably 35 wt % to 45 wt %, based on the total weight of the ink.

The multifunctional monomer according to the invention is selected from the group consisting of a trifunctional monomer, a tetrafunctional monomer and a pentafunctional monomer. In an embodiment, the multifunctional monomer is selected from the group consisting of a trifunctional acrylate monomer and a tetrafunctional acrylate monomer. Alternatively, the multifunctional monomer may be selected from the group consisting of a pentafunctional acrylate monomer, a trifunctional epoxide monomer, a tetrafunctional epoxide monomer, a pentafunctional epoxide monomer, a trifunctional oxetane monomer, a tetrafunctional oxetane monomer, a pentafunctional oxetane monomer, a trifunctional vinylether monomer, a tetrafunctional vinylether monomer and a pentafunctional vinylether monomer. For example, the multifunctional monomer may be ditrimethylolpropane tetraacrylate, for example the commercially available SR355. The advantage of ditrimethylolpropane tetraacrylate is its relatively safe use.

The amount of multifunctional monomer, for example the tri-, tetra or pentafunctional acrylate monomer is from 1 wt % to 10 wt %, preferably about 5 wt %, based on the total weight of the ink. The addition of a relatively small amount of multifunctional monomer of at least 1 wt % provides an improvement of curing speed while maintaining the improved adhesion onto rigid media while maintaining flexibility for adhesion onto flexible recording media.

The ink comprises at least one photoinitiator, and preferably at least three photoinitiators.

In an embodiment the ink comprises at least three photoinitiators, in particular 2 para tolyl-2-(dimethylamino)-4'-morfolinobutyrofenon, such as Irgacure 379, isopropyl thioxanthone, such as ITX and ethyl 4-(dimethylamino)benzoate, such as EDB. The total amount of the at least three photoinitiators is from 5 wt % to 15 wt %, based on the total weight of the ink.

The combination of the at least three photoinitiators provides a balance between surface curing speed and inner curing speed of the ink layer. During curing no inert environment is applied. It is known that surface cure may be reduced by the available oxygen on the outer surface of the ink layer.

Isopropyl thioxanthone is commonly known as a Type II photoinitiator. EDB is a highly efficient amine synergist which, when used in conjunction with Type II photoinitiators, generates free radicals that initiate photo-polymerisation of suitable curable formulations. The ITX and EDB according to the invention are preferably used together in a similar amount, based on the total weight of the ink.

The ratio of the Irgacure 379 to ITX is in the range 1:1 to 5:1, preferably the ratio is about 4:1. The amount of the photoinitiator Irgacure 379 in the ink is preferably from 5-10 wt %, based on the total weight of the ink The ink comprising the three photoinitiators Irgacure 379, ITX and EDB provides the advantage that an ink composition may be fast cured by using UV-led curing means. The UV-led curing means may provide radiation having a longer wavelength, e.g. radiation with a wavelength of more than 350 nm.

The colorant used in the ink may be a dye, a pigment or the like. Preferably the colorant is a pigment. The pigment may be dispersed in the ink by adding a dispersant. The amount of colorant in the ink is from 1 wt % to 15 wt %, based on the total weight of the ink.

The ink may also comprise a surfactant. The surfactant may be a curable surfactant or a non-curable surfactant.

In an embodiment the ink comprises a curable silicone polyether acrylate surfactant. In a particular embodiment the silicone acrylate surfactant is TEGO Rad 2200N. The curable silicone polyether acrylate surfactant may be present in the ink compositions of the invention in an amount in the range of from about 0,0005 wt % to about 0,005 wt %, based on the total weight of the ink.

An advantage of an ink comprising a curable silicone polyether acrylate surfactant, such as TEGO Rad 2200N in this amount is the improved de-wetting of the ink on a nozzleplate of a printhead, while maintaining a good print quality, including a high gloss level and a high optical density level, of the printed ink.

The ink may also comprise an inhibitor. The inhibitor is used to provide an improved thermal stability for the ink composition. Many inhibitors are well known in the art. For example the inhibitor may be selected from Genorad 18 or 4-methoxyphenol, such as MEHQ.

The ink may comprise a difunctional and/or multifunctional oligomer. The total amount oligomer may be 0 wt % to 10 wt % depending on the viscosity desired. The preferred oligomer is an aliphatic urethane difunctional (meth)acrylate, e.g. CN9001. The oligomer provides proper adhesion onto rigid media.

The viscosity of the radiation curable ink according to the present invention was measured by a method known in the art, using an Anton Paar MCR301 Rheometer. The geometry of the cone of the rheometer was PP50 The measuring program was set to gradually increased shear rate from 10 to 1000 1/s over the course of 5 minutes at a temperature of 50° C. The viscosity was then determined by fitting a curve through the obtained points.

EXAMPLES

The invention is now described by showing a particular embodiment of the invention in example 1 to 5.

A set of five pigmented inks compositions is provided according to the compositions as shown in Table 1.

TABLE 1 ink composition of radiation curable coloured inks

| Component | Name | Example 1 Wt % | Example 2 Wt % | Example 3 Wt % | Example 4 Wt % | Example 5 Wt % |
|---|---|---|---|---|---|---|
| Difunctional monomer | SR9003 | 43.9 | 42.6 | 39.6 | 44.8 | 20.6 |
| Tetrafunctional monomer | SR355 | 3.9 | 3.9 | 1.5 | 3.9 | 3.8 |
| Oligomer | CN9001 | 1.0 | 0.00 | 0.00 | 0.00 | 1.4 |
| Monofunctional monomer | IBOA | 17.1 | 16.9 | 17 | 17 | 19.7 |
| Monofunctional monomer | Vinylcaprolactam | 19.9 | 19.9 | 24.6 | 20.0 | 26.7 |
| Photoinitiator | Irgacure 379 | 7.8 | 7.7 | 7.7 | 7.7 | |
| Photoinitiator | Speedcure ITX | 1.5 | 1.5 | 1.5 | 1.5 | |
| Co-initiator | EDB | 1.5 | 1.5 | 1.5 | 1.5 | |
| Photoinitiator | Irgacure 184 | | | | | 12.2 |
| Photoinitiator | BAPO | | | | | 0.9 |
| Surfactant | Tegorad 2200N | 0.0025 | 0.0040 | 0.0005 | 0.0005 | 0.0050 |
| Inhibitor | MEHQ | 0.05 | 0.05 | 0.05 | 0.05 | 0.04 |
| Pigment dispersion | Pigment 1 | 3.2 | | | | |
| | Pigment 2 | | 3.2 | | | |
| | Pigment 3 | | | 6.5 | | |
| | Pigment 4 | | | | 3.6 | |
| | Pigment 5 | | | | | 14.5 |
| | Sum | 100 | 100 | 100 | 100 | 100 |

The invention claimed is:

1. A radiation curable ink having a viscosity of 30 mPa·s or less at 50° C., the ink comprising at least two monofunctional monomers, the at least two monofunctional monomers comprising a first monomer selected from an N-vinyl amide and a second monofunctional monomer being isobornyl acrylate, a difunctional acrylate monomer being propoxylated or ethoxylated neopentyl glycol di acrylate, at least one multifunctional monomer selected from the group consisting of a trifunctional acrylate monomer, a tetrafunctional acrylate monomer, a pentafunctional acrylate monomer, a trifunctional epoxide monomer, a tetrafunctional epoxide monomer, a pentafunctional epoxide monomer, a trifunctional oxetane monomer, a tetrafunctional oxetane monomer, a pentafunctional oxetane monomer, a trifunctional vinylether monomer, a tetrafunctional vinylether monomer and a pentafunctional vinylether monomer, the ink further comprising at least one photoinitiator and a colorant; wherein the amount of multifunctional acrylate monomer is from 1 wt % to about 5 wt % based on the total weight of the ink.

2. The radiation curable ink according to claim 1, wherein the multifunctional monomer is a trifunctional acrylate monomer or a tetrafunctional acrylate monomer.

3. The radiation curable ink according to claim 2, wherein the multifunctional monomer is ditrimethylolpropane tetraacrylate.

4. The radiation curable ink as claimed in claim 1, wherein the amount of the first monomer is from 15 to 25 wt % based on the total weight of the ink.

5. The radiation curable ink as claimed in claim 1, wherein the amount of the second monomer is from 15 wt % to 25 wt % based on the total weight of the ink.

6. The radiation curable ink as claimed in claim 1, wherein the amount of difunctional acrylate monomer is from 15 wt % to 60 wt %, based on the total weight of the ink.

7. The radiation curable ink as claimed in claim 1, wherein the ink comprises at least three photoinitiators comprising 2 para tolyl-2-(dimethylamino)-4'-morfolinobutyrofenon, isopropyl thioxanthone and ethyl 4-(dimethylamino)benzoate and the total amount of the at least three photoinitiators is from 5 wt % to 15 wt %, based on the total weight of the ink.

8. The radiation curable ink as claimed in claim 7, wherein the amount of the photoinitiator 2 para tolyl-2-(dimethylamino)-4'-morfolinobutyrofenon is from 5-10 wt %, based on the total weight of the ink.

9. The radiation curable ink as claimed in claim 1, wherein the ink comprises a curable silicone polyether acrylate surfactant in an amount in the range of from about 0.0005 wt % to about 0.005 wt %, based on the total weight of the ink.

10. The radiation curable ink as claimed in claim 9, wherein the surfactant is Tegorad 2200N.

11. The radiation curable ink as claimed in claim 2, wherein the amount of the second monomer is from 15 wt % to 25 wt % based on the total weight of the ink.

12. The radiation curable ink as claimed in claim 3, wherein the amount of the second monomer is from 15 wt % to 25 wt % based on the total weight of the ink.

13. The radiation curable ink as claimed in claim 2, wherein the amount of difunctional acrylate monomer is from 15 wt % to 60 wt %, based on the total weight of the ink.

14. The radiation curable ink as claimed in claim 3, wherein the amount of difunctional acrylate monomer is from 15 wt % to 60 wt %, based on the total weight of the ink.

15. The radiation curable ink as claimed in claim 2, wherein the ink comprises at least three photoinitiators comprising 2 para tolyl-2-(dimethylamino)-4'-morfolinobutyrofenon, isopropyl thioxanthone and ethyl 4-(dimethylamino) benzoate and the total amount of the at least three photoinitiators is from 5 wt % to 15 wt %, based on the total weight of the ink.

16. The radiation curable ink as claimed in claim 3, wherein the ink comprises at least three photoinitiators comprising 2 para tolyl-2-(dimethylamino)-4'-morfolinobutyrofenon, isopropyl thioxanthone and ethyl 4-(dimethylamino) benzoate and the total amount of the at least three photoinitiators is from 5 wt % to 15 wt %, based on the total weight of the ink.

17. The radiation curable ink as claimed in claim 2, wherein the ink comprises a curable silicone polyether acrylate surfactant in an amount in the range of from about 0.0005 wt % to about 0.005 wt %, based on the total weight of the ink.

18. The radiation curable ink as claimed in claim 1, wherein the amount of difunctional acrylate monomer is from 39.6 wt % to 60 wt %, based on the total weight of the ink.

\* \* \* \* \*